Patented Nov. 14, 1950

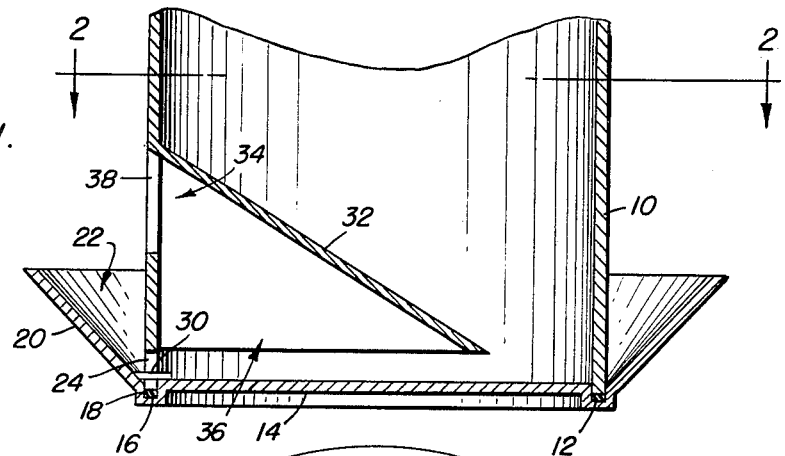
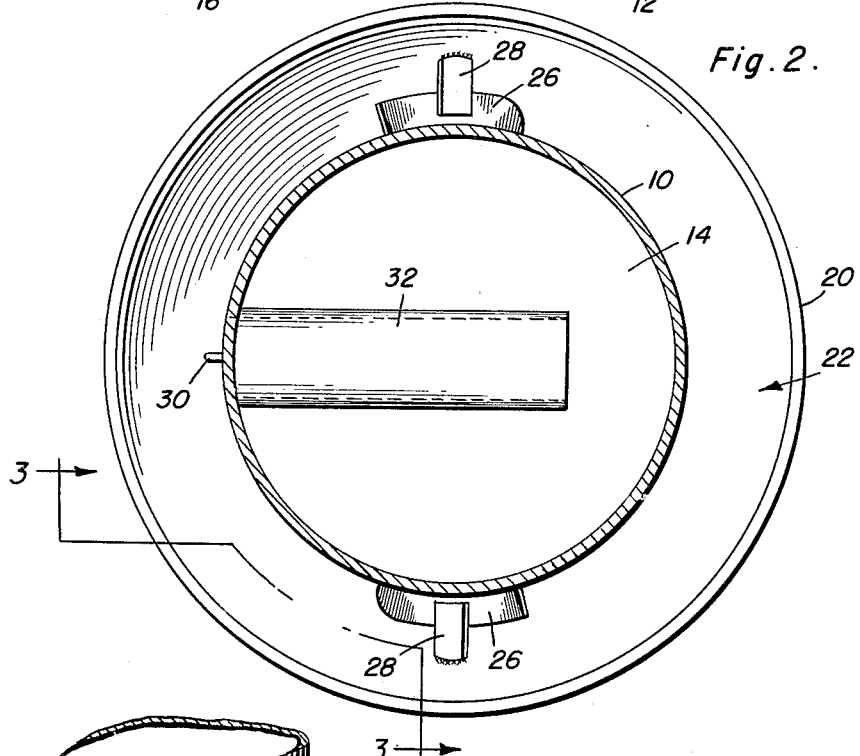
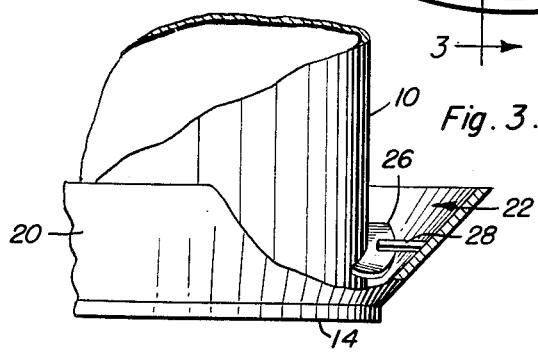
Inventor
John Charles Oldfield

2,529,627

UNITED STATES PATENT OFFICE 2,529,627

WATERING DEVICE

John Charles Oldfield, Yakima, Wash.

Application May 12, 1949, Serial No. 92,897

1 Claim. (Cl. 119—77)

This invention relates to new and useful improvements and structural refinements in watering devices for poultry, or the like, and in particular the invention concerns itself with improvements on a watering device which constitutes the subject matter of United States Patent No. 2,413,647, which was granted to me on December 31, 1946.

While experimenting with and using the watering device constructed in accordance with the teachings of my prior patent, I found that the same lends itself to certain improvements whereby the operation and general utility thereof are greatly enhanced.

The present invention embodies such improvements, one important feature being the provision of a separate tank and a separate trough-forming receptacle positioned under the tank, together with means for separably attaching the tank to the receptacle so that the interior thereof may be quickly and easily cleaned.

Another feature of the present invention resides in the construction of the filler of the tank, this being so arranged that in addition to its primary purpose for filling the tank, it also serves as a receptacle for an electric heater whereby the contents of the tank may be prevented from freezing.

Some of the advantages of the invention lie in its simplicity of construction, in its simple and effective operation, and in its adaptability to economical manufacture.

With the above more important objects and features in view and such other objects and features as may become apparent as this specification proceeds, the invention consists essentially in the construction and arrangement of parts as shown in the accompanying drawings, in which:

Figure 1 is a fragmentary cross-sectional view showing the improved structural arrangement of the bottom portion of the watering device disclosed in my prior U. S. Patent No. 2,413,647;

Figure 2 is a cross-sectional view, taken substantially in the plane of the line 2—2 in Figure 1; and Figure 3 is a fragmentary cross-sectional detail, taken substantially in the plane of the line 3—3 of Figure 2.

Like characters of reference are used to designate like parts in the specification and throughout the several views.

Referring now to the accompanying drawings in detail, the reference character 10 designates a tank of the watering device, this tank having a closed top and an open bottom, its bottom edge being illustrated at 12.

A dish-like receptacle 14 is positioned under the tank 10 and is formed with a circular keeper groove or channel 16 to receive the bottom edge portion of the tank, a suitable annular gasket 18 being provided in the groove 16 for a purpose which will be hereinafter described.

The receptacle 14 has an upwardly and outwardly extending side wall 20 which defines a perimetric trough 22 around the bottom portion of the tank 10, it being noted that the bottom portion of the tank is provided with a notch or opening 24 whereby the drinking trough communicates with the interior of the tank, as will be clearly understood. Needless to say, matters are so arranged that the side wall 20 of the trough 22 extends substantially above the upper edge of the opening 24, so that the flow of water from the tank into the trough is controlled by atmospheric pressure and the water in the drinking trough is maintained at a constant level.

Means are provided for separably attaching the receptacle 14 to the tank 10 so that the interior thereof may be readily and conveniently cleaned when necessary, these means consisting of a pair of cam-surfaced segments 26 which are secured by welding, or the like, to diametrically opposite sides of the bottom portion of the tank 10 and are frictionally engageable with a pair of keeper elements or lugs 28 rigidly secured at diametrically opposite points to the inner surface of the side wall 20 of the receptacle 14.

The tank 10 is rotatable relative to the receptacle 14, whereby the elements 28 may be brought in frictional engagement with the cam-surfaced segments 26, thus holding the tank and the receptacle together. It is to be noted that when the tank is rotated relative to the receptacle so as to tighten the securing means, the gasket 18 is somewhat compressed and by its inherent resiliency maintains the segments 26 and elements 28 in frictional engagement, so that undesired separation of the tank and receptacle is prevented.

Means are also provided for restricting the extent of rotation of the tank relative to the receptacle, these means consisting of a stop pin 30 which is secured in the receptacle 14 so that it bridges the groove 16, the pin 30 being receivable in the opening 24 when the tank is applied to the receptacle, so that the tank may be rotated relative to the receptacle only within the limit of movement of the pin 30 in the opening 24.

The filler 32 for the tank 10 assumes the form of an inverted channel which, in elevation, is substantially triangular and has an open side 34 and an open bottom 36. The filler 32 is secured by its open side to the inner surface of the tank 10 in register with an opening 38 with which the side wall of the tank is formed, the opening 38 being disposed well above the level of the opening 24 and above the upper edge of the trough 22, as is best shown in Figure 1. It will be observed that the filler 32 is so disposed in the tank 10 that the open bottom 36 of the filler is spaced above the bottom of the receptacle 14 which, in effect, constitutes a removable bottom for the tank.

It is also to be observed that the open bottom 36 of the filler 32 is elongated and is disposed below the upper edge of the trough 22, so that the provision of the filler by no means affects the operation of the device under the control of atmospheric pressure.

It is to be noted that the elongated open bottom 36 of the filler 32 facilitates insertion of an electric heater, of conventional type, through the opening 38 into the bottom of the tank 10, thus to prevent the water in the tank as well as in the trough 22 from freezing.

It is believed that the advantages and use of the invention will be readily apparent from the foregoing disclosure, and, accordingly, further description thereof at this point is deemed unnecessary.

Having described the invention, what is claimed as new is:

In a watering device including a dish-shaped trough having a bottom, an upwardly and outwardly extending side wall and an annular groove in said bottom at the lower edge of said side wall, and an inverted tank having an open annular lower end portion thereof rotatably seated in said groove, means for separably attaching said tank to said trough, said means comprising a set of circumferentially spaced lugs secured to and projecting inwardly from the inner surface of said side wall substantially above said bottom, and a set of spiral arcuate strips secured at one longitudinal edge thereof to the outer surface of said tank and projecting outwardly therefrom, said strips affording inclined upper surfaces frictionally engageable with lower surfaces of the respective lugs whereby to sustain the tank in position on the trough.

JOHN CHARLES OLDFIELD.

REFERENCES CITED

The following references are of record in the file of this patent:

UNITED STATES PATENTS

| Number | Name | Date |
| --- | --- | --- |
| 1,101,286 | Jones | June 23, 1914 |
| 1,107,206 | Schwartzburg | Aug. 11, 1914 |
| 1,337,988 | Abel | Apr. 27, 1920 |
| 1,711,366 | Tool | Apr. 30, 1929 |
| 1,759,243 | Reid | May 20, 1930 |
| 1,815,964 | Boyer | July 28, 1931 |
| 1,915,407 | Crary | June 27, 1933 |
| 2,329,865 | Tolley | Sept. 21, 1943 |
| 2,413,647 | Oldfield | Dec. 31, 1946 |